United States Patent
Ran

(10) Patent No.: US 9,344,219 B2
(45) Date of Patent: May 17, 2016

(54) INCREASING COMMUNICATION SAFETY BY PREVENTING FALSE PACKET ACCEPTANCE IN HIGH-SPEED LINKS

(71) Applicant: Intel Corporation, Santa Clara, CA (US)

(72) Inventor: Adee O. Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 13/926,041

(22) Filed: Jun. 25, 2013

(65) Prior Publication Data

US 2014/0380132 A1    Dec. 25, 2014

(51) Int. Cl.
| | |
|---|---|
| *H03M 13/00* | (2006.01) |
| *H04L 1/00* | (2006.01) |
| *H04L 1/20* | (2006.01) |
| *H04L 1/24* | (2006.01) |

(52) U.S. Cl.
CPC .............. *H04L 1/0057* (2013.01); *H04L 1/203* (2013.01); *H04L 1/245* (2013.01); *H04L 1/0045* (2013.01)

(58) Field of Classification Search
CPC ... H04L 1/0057; H04L 1/0061; H04L 1/0041; H04L 1/0083; H04L 1/0072
USPC .......................................................... 714/776
See application file for complete search history.

(56) References Cited

U.S. PATENT DOCUMENTS

| | | | |
|---|---|---|---|
| 6,188,496 B1 * | 2/2001 | Krishna et al. | 398/177 |
| 8,566,687 B1 * | 10/2013 | Eliaz | H04L 25/03178 375/261 |
| 2005/0005189 A1 | 1/2005 | Khermosh et al. | |
| 2010/0125764 A1 | 5/2010 | Kose | |
| 2011/0021170 A1 * | 1/2011 | Kolze | H04L 25/03019 455/296 |
| 2011/0138250 A1 | 6/2011 | Ganga et al. | |
| 2013/0117639 A1 | 5/2013 | Ganga et al. | |

OTHER PUBLICATIONS

Adee Ran et al., "Option to Bypass Error Marking", supporting comment #205, IEEE P802.3bj, 100 Gb/s, Backplane and Copper Cable, Phoenix, Jan. 2013, 20 pages.
International Search Report and Written Opinion received for PCT Patent Application No. PCT/US2014/042648, mailed on Oct. 7, 2014, 15 pages.
International Preliminary Report on Patentability and Written Opinion received for PCT Patent Application No. PCT/US2014/012648, mailed on Jan. 7, 2016, 12 pages.

* cited by examiner

*Primary Examiner* — Albert Decady
*Assistant Examiner* — Enam Ahmed
(74) *Attorney, Agent, or Firm* — Law Office of R. Alan Burnett, P.S

(57) ABSTRACT

Methods, apparatus, and systems for preventing false packet acceptance in high-speed links. Under one aspect, correctable symbol errors are detected, and determination is made to whether a symbol error rate or ratio (SER) exceeds an SER threshold. In response to detection of such a condition, the link is disconnected or temporarily paused. The value for the SER threshold is determined using a statistical analysis of various link parameters to meet desired performance levels, such as a mean time to false packet acceptance (MTTFPA) of >approximately 15 billion years while providing a mean time to disconnect of >100 years.

26 Claims, 14 Drawing Sheets

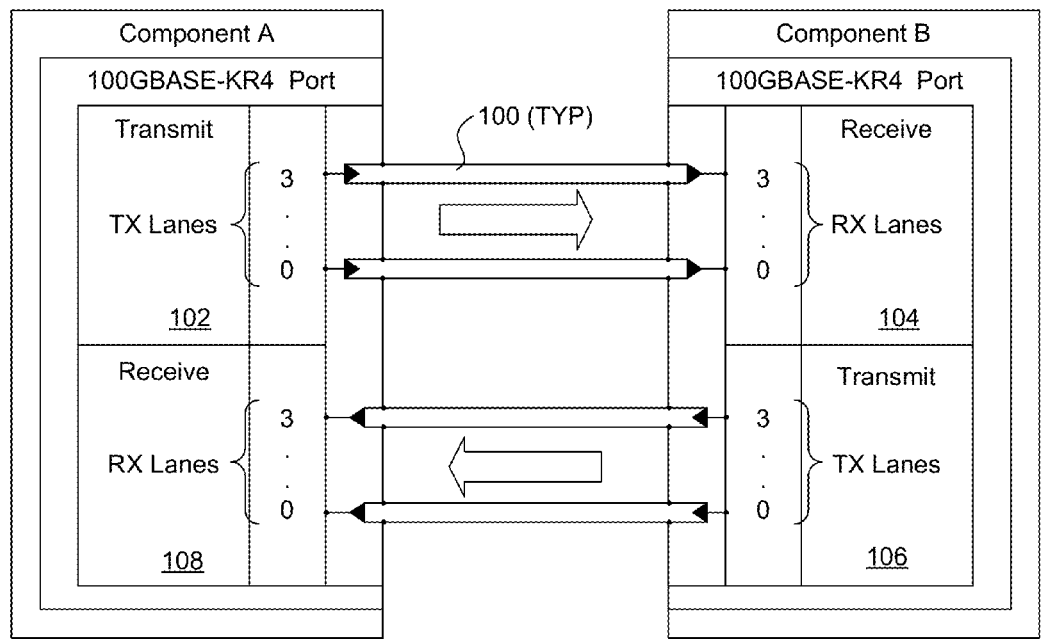

Figure 91-1—RS-FEC relationship to the ISO/IEC Open Systems Interconnection (OSI) reference model and the IEEE 802.3 CSMA/CD LAN model

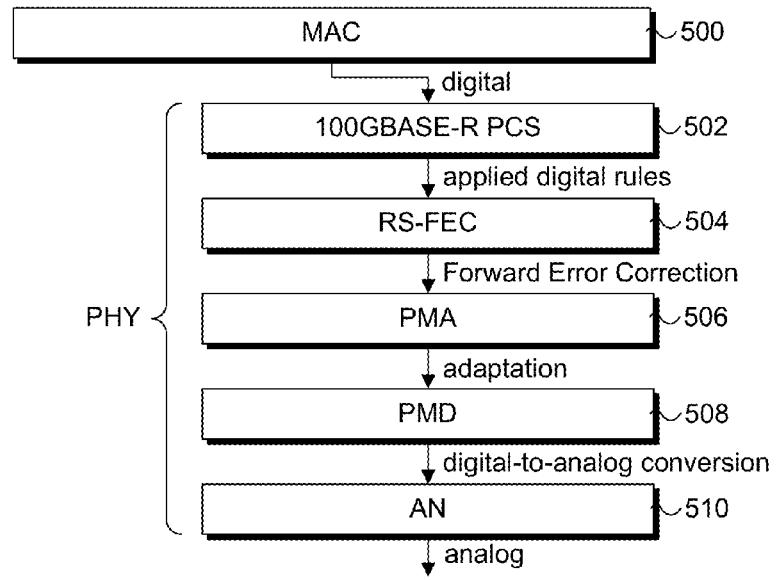
Fig. 4b *(prior art)*
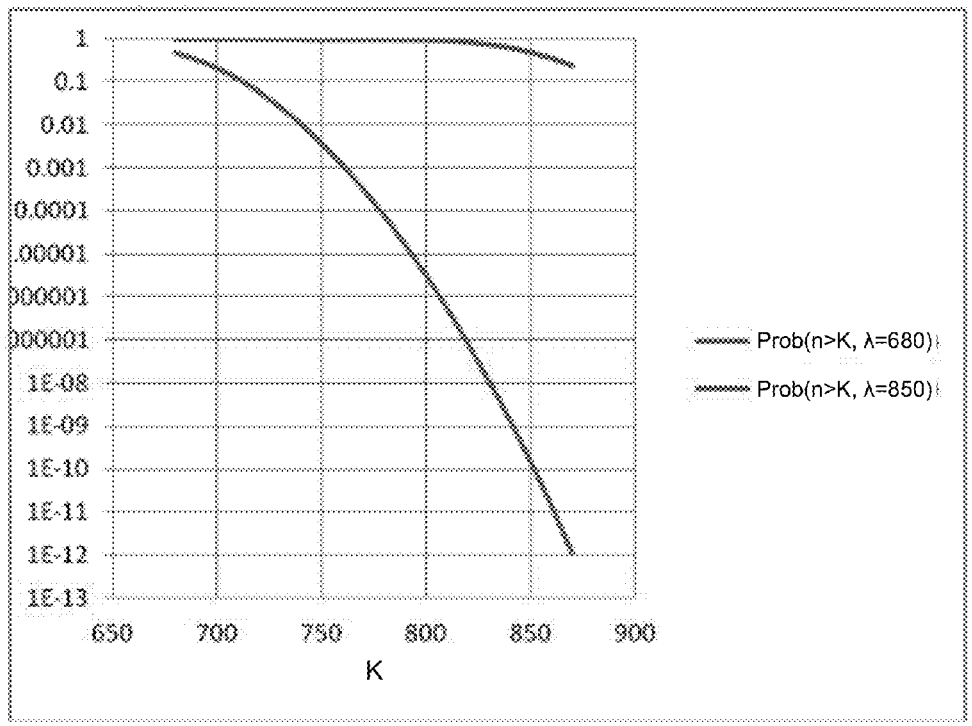
Fig. 5

| Results\Mode | A (Correct and mark) | B (Bypass) | C (Correct w/o marking) | D (Detect and mark) |
|---|---|---|---|---|
| FER | 1.71E-10 | 0.235943024 | 1.71E-10 | 0.235943024 |
| link utilization | 99.9999998% | 76.4948765% | 99.9999998% | 76.4948765% |
| MTTFPA (sec) | Assumed non issue | 1.1E+03 | 1.0E+11 | Assumed non issue |
| MTTFPA (years) | | 3.8E-06 | 4.9E+03 | |

SNR Improvement – 0.00 dB

| Results\Mode | A (Correct and mark) | B (Bypass) | C (Correct w/o marking) | D (Detect and mark) |
|---|---|---|---|---|
| FER | 2.04E-15 | 0.066026486 | 2.04E-15 | 0.066026486 |
| link utilization | 100.0000000% | 93.3973594% | 100.0000000% | 93.3973594% |
| MTTFPA (sec) | Assumed non issue | 4.4E+02 | 1.3E+16 | Assumed non issue |
| MTTFPA (years) | | 1.4E-05 | 4.1E+08 | |

SNR Improvement – 0.70 dB

| Results\Mode | A (Correct and mark) | B (Bypass) | C (Correct w/o marking) | D (Detect and mark) |
|---|---|---|---|---|
| FER | 1.43E-16 | 0.048211717 | 1.43E-16 | 0.048211717 |
| link utilization | 100.0000000% | 95.1788283% | 100.0000000% | 95.1788283% |
| MTTFPA (sec) | Assumed non issue | 5.5E+02 | 7.8E+16 | Assumed non issue |
| MTTFPA (years) | | 1.8E-05 | 2.5E+09 | |

SNR Improvement – 0.80 dB

| Results\Mode | A (Correct and mark) | B (Bypass) | C (Correct w/o marking) | D (Detect and mark) |
|---|---|---|---|---|
| FER | 5.55E-17 | 0.038498373 | 5.55E-17 | 0.038498373 |
| link utilization | 100.0000000% | 96.1501628% | 100.0000000% | 96.1501628% |
| MTTFPA (sec) | Assumed non issue | 6.9E+02 | 4.8E+17 | Assumed non issue |
| MTTFPA (years) | | 2.2E-05 | 1.5E+10 | |

SNR Improvement – 0.90 dB

*Fig. 9*

INCREASING COMMUNICATION SAFETY BY PREVENTING FALSE PACKET ACCEPTANCE IN HIGH-SPEED LINKS

FIELD OF THE INVENTION

The field of invention relates generally to network communications and, more specifically but not exclusively relates to techniques for preventing false packet acceptance in high-speed links.

BACKGROUND INFORMATION

An important feature of network communication is data integrity. Under Ethernet, for example, this is accomplished using a 32-bit Cyclic Redundancy Check (CRC32) field that is added to each Ethernet MAC (Media Access Control) frame. The CRC provides full protection against many types of errors, including up to 3 bit errors in a normal-size MAC frame and bursts of consecutive errors up to 32 bits long. Other combinations of errors may pass the CRC32 check with a small probability (up to $2^{-32}$ for random error distribution).

If multiple errors occur on an Ethernet link, the MAC frame could pass the CRC32 check; this event is called false packet acceptance, and ideally it should never occur. For example, the data for a MAC frame could be received with multiple errors that by random chance produce the same CRC32 value as a MAC frame with no errors. In practice, communication errors can't be totally prevented; the desire is that false packet acceptance would be so rare that the time until one is expected to happen (mean time to false packet acceptance, or MTTFPA) is larger than the age of the universe (AOU—about 13 Billion years).

Several physical layer (PHY) types for Ethernet over backplanes, Optics, and copper cables, at 10 Gb/s data rates and above are defined in various clauses of the IEEE 802.3 standard. The bit error ratio (BER) required for these PHYs is typically 1e-12. With this BER, if errors are uncorrelated to each other, the probability that enough errors occur to prevent CRC32 from detecting them is low enough to ensure MTTFPA>AOU. If errors occur at a much higher rate (BER>>1e-12), then MTTFPA may not be as large as desired. To prevent this condition from existing too long, there is a mechanism called BER monitor that, is sensitive to errors at known locations (sync headers). If errors occur at random times, some of them will eventually occur at the sync headers. Detecting too frequent sync header errors (a condition called hi_ber) will cause a receiver fault condition, which will in some cases trigger a disconnection of the communication link, or optionally may cause transmission of data over the link to be temporarily paused.

The 802.3bj task force defines 100 Gb/s Ethernet over backplanes and copper cables. This work includes strong forward error correction (FEC) using Reed-Solomon (RS) code, which enables operation with lower signal to noise ratio (SNR) than unprotected data encoding. This code (denoted RS-FEC) operates over 10-bit blocks (called "symbols") and can correct several symbol-errors in a block of 514 symbols; for two PHY types (100GBASE-KR4 and 100GBASE-CR4), up to 7 symbol-errors are correctable, and for a third type (100GBASE-KP4) up to 15 symbol-errors are correctable.

If link quality is not high enough, events of too many symbol errors can occur; these errors can't be corrected. If the erroneous data is passed to the MAC, the CRC32 is not guaranteed to detect the errors, since there are too many of them. To prevent this from happening, the FEC decoder is required to mark uncorrectable codewords in a way that would cause the MAC to ignore them; this marking is done by corrupting the sync headers in the data output of the RS-FEC sublayer.

One problem with this approach is that implementation of uncorrectable error marking requires identifying that a codeword is uncorrectable; there are ways to implement that with low gate count (but with high latency), or with low latency (but with high gate count); both cannot be achieved together. Thus, requiring uncorrectable error marking poses a tradeoff that must be made at design time.

It would be advantageous if this requirement could be removed; however, when errors are not marked, the problem of MTTFPA arises. Due to the nature of the error correction code, small changes in SNR, which have a small effect on the BER before error correction (PMD BER), have a large effect on the uncorrectable codeword ratio (UCR) and thus on MTTFPA. In fact, a difference of 1 dB in SNR can change the MTTFPA from being >AOU to a few thousand years, which is unacceptable. Thus, it is difficult to assess whether the link is safe or not.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a schematic diagram illustrating the structure of a 100GBASE-KR4 link, according to one embodiment;

FIG. 3a is a diagram illustrating mapping for PAM2 encoding;

FIG. 3b is a diagram illustrating mapping for PAM4 encoding;

FIG. 4b is a process flow diagram illustrating further details of selected LAN CSMA/CD layers in FIG. 4a;

FIG. 5 is a graph illustrating MTTFPA vs. a threshold T using two values for λ;

FIG. 9 is a comparison diagram illustrating changes to various link parameters as a function of signal-to-noise (SNR) improvement;

FIG. 12b is a rear isometric view of the blade server chassis of FIG. 16a;

DETAILED DESCRIPTION

Figure 2A:
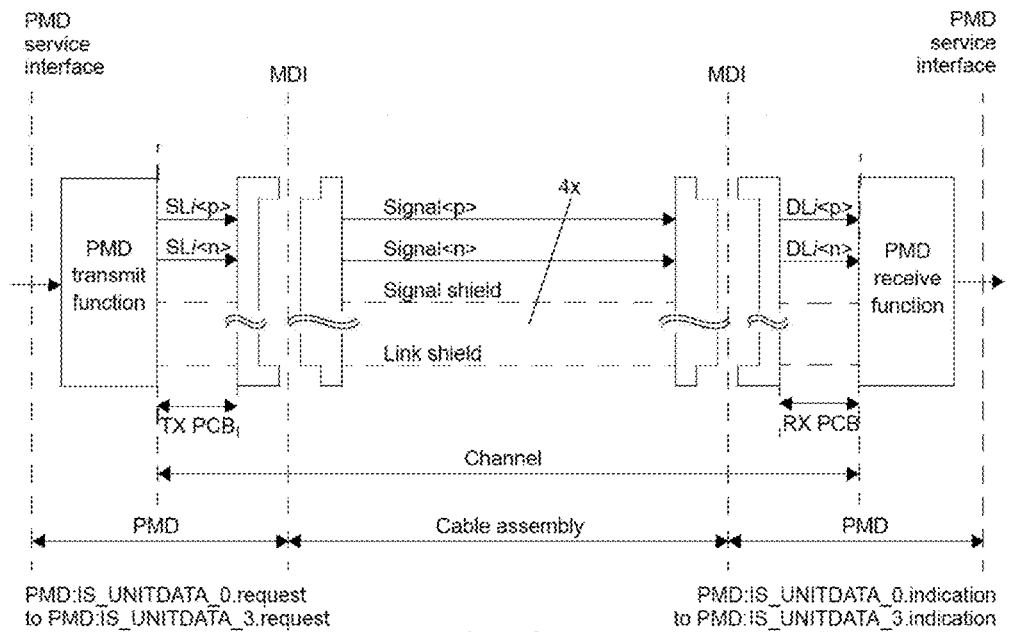
FIG. 2a shows a Physical Media Dependent (PMD) sub-layer link block diagram for a 100GBASE-CR4 link in one direction.

Embodiments of methods, apparatus, and systems for preventing false packet acceptance in high-speed links are described herein. In the following description, numerous specific details are set forth (such as example embodiments relating to the proposed IEEE 100 Gb/s Ethernet links) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of apparatus and methods for preventing false packet acceptance in Ethernet communication are described herein. By way of example and without limitation, some embodiments are presented herein pertaining to proposed 100 Gb/s Ethernet links, such as the proposed 100GBASE-KR4, 100GBASE-CR4, and 100GBASE-KP4 links. In addition to aspects of these links described herein, other aspects of some embodiments are described in further detail in IEEE P802.3bj Draft 2.0, as well as other IEEE 802.3 specifications.

The PHY structure of one embodiment of a 100GBASE-KR4 link is illustrated in FIG. 1. The PHY defines the physical structure of the interconnect and is responsible for dealing with details of operation of the signals on a particular link between two link partners (also referred to as endpoints), such as depicted by components A and B. This layer manages data transfer on the signal wires, including electrical levels, timing aspects, and logical issues involved in sending and receiving each bit of information across the parallel lanes. As shown in FIG. 1, the physical connectivity of each interconnect link is made up of four differential pairs of signals 100, comprising lanes 0-3 in each direction. Each port supports a link pair consisting of two uni-directional links to complete the connection between two components. This supports traffic in both directions simultaneously. The PHY structure of a 100GBASE-CR4 link has a similar configuration to that shown in FIG. 1, as does the PHY structure of a 100GBASE-KP4 link.

Components with 100GBASE-KR4/CR4/KP4 ports communicate using a pair of uni-directional point-to-point links, defined as a link pair, as shown in FIG. 1. Each port comprises a Transmit (Tx) link interface and a Receive (Rx) link interface. For the illustrated example, Component A has a Tx port 102 that is connected to Component B Rx port 104. Meanwhile, Component B has a Tx port 104 that is connected to Component B Rx port 108. One uni-directional link transmits from Component A to Component B, and the other link transmits from Component B to Component A. The "transmit" link and "receive" link is defined relative to which component port is transmitting and which is receiving data. In the configuration illustrated in FIG. 1, the Component A transmit link transmits data from the Component A Tx port 102 to the Component B Rx port 104. This same Component A transmit link is the Port B receive link.

Figure 2B:
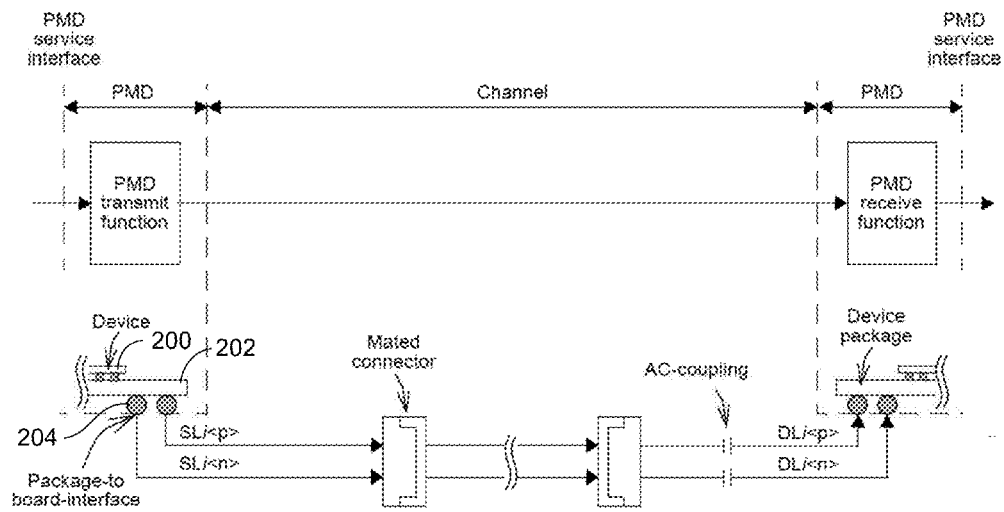
FIG. 2b shows a PMD sub-layer link block diagram for a 100GBASE-KR4 link in one direction.

FIG. 2a depicts a Physical Media Dependent (PMD) sublayer link block diagram for a 100GBASE-CR4 link in one direction. A similar PMD sub-layer link block diagram for a 100GBASE-KR4 link in one direction is shown in FIG. 2b. Each of 100GBASE-CR4 and 100GBASE-KR4 employ four lanes in each direction, with the signaling for each lane implemented using a differential signal pair.

A primary difference between 100GBASE-CR4 and 100GBASE-KR4 is that 100GBASE-CR4 defines use of a cable-based link while 100GBASE-KR4 defines implementation of a link in a circuit board or the like (e.g., in a backplane or mid-plane). Similarly, 100GBASE-KP4 also defines implementation of a link in a circuit board or the like. As depicted in FIG. 2b, a device 200, such as a network interface controller (NIC) chip with a 100GBASE-KR4 PHY, is coupled to a package 202, which in turn is coupled to a board via solder pads 204. Signal paths are routed in the board on separate layers to facilitate transfer of signals between TX and RX ports on the NIC chip or other Ethernet PHY interface ports.

Each of 100GBASE-KR4 and 100GBASE-CR4 use a two-level pulse amplitude modulation (referred to as PAM2) signal to send and receive data across the channel. As shown in FIG. 3a, PAM2 consists of two logical levels that are mapped as follows:

0 maps to −1
1 maps to +1

Logical levels 0 and 1 respectively correspond to low and high level signals having signal levels −1 and +1.

The 100GBASE-KP4 PHY uses a four-level pulse amplitude modulation (referred to as PAM4) signal to send and receive data across the channel. As shown in FIG. 3b, PAM4 consists of four logical levels that are mapped as follows:

0 maps to −1
1 maps to −⅓
2 maps to +⅓
3 maps to +1

Logical levels 0 and 3 respectively correspond to low and high level signals having signal levels −1 and +1, while logical levels 1 and 2 correspond to intermediate level signals have signal levels −⅓ and +⅓.

Figure 4A:
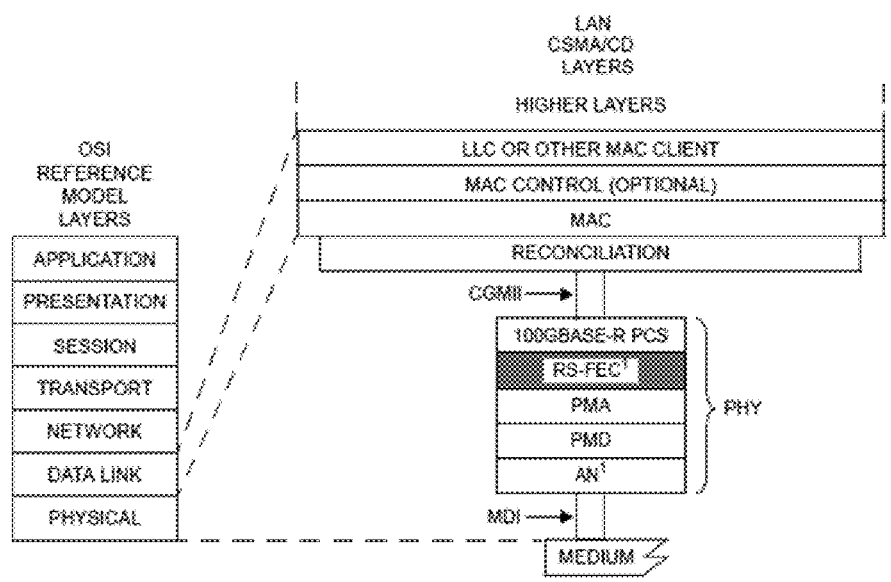
FIG. 4a is diagram illustrating Data Link and Physical layers of the OSI reference model and IEEE 802.3 LAN CSMA/CD LAN model layers corresponding to the current draft of IEEE P802.3bj Draft 2.0.

FIG. 4a shows details of the relationship between the Data Link and Physical layers of the OSI reference model and IEEE 802.3 LAN CSMA/CD LAN model layers corresponding to the current draft of IEEE P802.3bj Draft 2.0. FIG. 4b shows further details of selected LAN CSMA/CD layers, including a MAC (Media Access Control) layer 400, a 100GBASE-R Physical Coding Sublayer (PCS) sublayer 402, a Reed Solomon Forward Error Correction (RS-FEC) sublayer 404, a Physical Media Attachment (PMA) sublayer 406, a Physical Media Dependent (PMD) sublayer 408, and an Auto-Negotiation (AN) sublayer 410. Data is received in digital format as a binary bit stream by MAC layer 400, which processes and forwards the binary data to 100GBASE-R PCS sublayer 402, which applies digital rules to the binary data to transform the data as described below. The transformed digital data are then passed to RS-FEC sublayer 404, which performs Forward Error Correction using a Reed-Solomon encoder. FEC uses the coding gain to increase the link budget and BER performance on a given channel. The link budget consists of the electrical parameters which define the connection between the transmit circuitry and the receive circuitry, such as insertion loss, return loss, pulse response, etc.

RS-FEC sublayer 404 performs forward error correction using Reed-Solomon code (RS-FEC). In one embodiment, RS-FEC is performed in the manner defined in IEEE P802.3bj Draft 2.0 Clause 91.7. As discussed above, the RS-FEC code operates over 10-bit blocks (called "symbols"). Transmitted data is packed in blocks of 514 symbols, to which a number of parity symbols are added to create codewords. An RS-FEC decoder can correct several symbol-errors in a codeword, according to the number of parity symbols added; for two PHY types (100GBASE-KR4 and 100GBASE-CR4), 14 parity symbols are added (creating 528-symbol codewords) and up to 7 symbol-errors in a codeword are correctable, and for a third type (100GBASE-KP4) 30 parity symbols are added (creating 544-symbol codewords) and up to 15 symbol-errors in a codeword are correctable.

In further detail, as defined in IEEE P802.3bj Draft 2.0, the RS-FEC sublayer employs a Reed-Solomon code operating over the Galois Field $GF(2^{10})$ where the symbol size is 10 bits. The encoder processes k message symbols to generate 2t parity symbols which are then appended to the message to produce a codeword of n=k+2t symbols. As used herein, a particular Reed-Solomon code is denoted RS(n, k). When used to form a 100GBASE-CR4 or 100GBASE-KR4 PHY, in one embodiment the RS-FEC sublayer implements RS(528, 514). When used to form a 100GBASE-KP4 PHY, in one embodiment the RS-FEC sublayer implements RS(544, 514). Each k-symbol message corresponds to twenty 257-bit blocks produced by the transcoder.

Under IEEE P802.3bj Draft 1.2, the modes shown in the following table were allowed.

TABLE 1

| Mode | Correctable Errors | Uncorrectable Errors | Latency | MTTFPA |
|---|---|---|---|---|
| A | Correct | Mark | Baseline + ~140 ns | Sufficient |
| Bypass | Pass through | Pass through | Baseline | Too short |
| Correct | Correct | Pass through | Baseline + ~90 ns | Depends on UCR |
| Detect | Mark | Mark | Baseline + ~50 ns | Sufficient |

Under Mode A, correctable errors are corrected and uncorrectable errors are marked. The results in sufficient MTTFPA, but requires either approximately 140 ns of latency, or a significant increase of the PHY circuitry complexity. Under Mode B, there are no provisions for addressing correctable or uncorrectable errors. While this results in no additional latency, it does not address the MTTFPA requirement, and thus is generally not a practical option. Mode C corrects the correctable errors, while passing through uncorrectable errors without marking. This results in approximately 90 ns of latency, while the MTTFPA depends on the uncorrectable codeword ratio (UCR), since any uncorrectable codeword might result in a false packet being accepted. Under Mode D, both correctable and uncorrectable errors are marked, causing approximately 50 ns of latency while providing sufficient MTTFPA, but at a cost of reduced link utilization—since packets are dropped whenever an error is marked even if it was correctable.

The foregoing latencies may be reduced using a parallelized implementation, but at a hardware cost. For example, it is estimated that a minimum latency implementation of mode A would add at least 10% to the PHY gate count. Thus, increasing the complexity and gate count of the PHY circuitry is not a favored option.

In accordance with embodiments of the invention, link safety is effected by measuring the rate of correctable symbol errors and determining whether the link is operating to meet the MTTFPA requirement based on whether this rate exceeds a threshold that is determined using statistical analysis. Under one embodiment, the RS-FEC ability to identify and count symbol errors (number of symbols in each codeword that are corrected) is implemented along with a counter to determine an average symbol error rate or symbol error ratio (SER), which can be estimated by counting the symbol errors in a counter that is reset using a predetermined timer interval, such as every 1 millisecond, or using a predetermined number of codewords.

In further detail, statistical analysis of the SER, UCR, and MTTFPA shows that to get a sufficiently large MTTFPA (15 billion years, more than the assumed age of the universe), the SER should be lower than 6.6e-5. With this value, the expected number of errors per millisecond is 680. Increasing the SER slightly to 8.3e-5 (equivalent to a 0.1 degradation of SNR, and MTTFPA of 2.5 billion years) increases the expected number of errors per millisecond to 855.

In one embodiment For PAM4 links, e.g., 100GBASE-KP4, SER=1.3e-3 is required, with 7100 errors expected per ms; a 0.1 dB degradation causes SER=1.5e-3, 8392 errors expected per ms, and an MTTFPA of approximately 1 billion years.

The probability of having k symbol errors in 1 ms, given the expected number is λ, follows the Poisson distribution with parameter λ:

$$P(n=k) = \frac{\lambda^k}{k!} e^{-\lambda} \quad (1)$$

The probability of having more than K symbol errors is the cumulative distribution function which can be calculated numerically. It is between 0.5 and 1 when K<λ, but drops sharply when K grows above λ, as shown in the graph of FIG. 5. By modeling the cumulative distribution using Equation 1, measurement parameters may be determined to obtain a target MTTFPA in view of the applicable link operating conditions and/or capabilities.

For example, with a PMD BER of 4e-5, a frame error ratio (FER) of 1.7e-10 is obtained, but MTTFPA is only approximately 5000 years. However, to improve MTTFPA 10-fold, the PMD BER only needs to be improved slightly, to 3e-5. This relates to approximately 0.15 dB SNR improvement (assuming an additive white Gaussian noise (AWGN) channel model); moreover, each 0.15 dB increase in SNR improves MTTFPA by 10×. As a result, improving the PMD BER to 6.1e-6 brings MTTFPA to approximately AOU. This requires only approximately a 0.89 dB SNR improvement, resulting in a virtually error-free link (FER<1e-16). The foregoing calculations assume a 100GBASE-KR4 or 100GBASE-CR4 RS-FEC, with highly correlated errors (DFE C=1). Using C=0.1 results in approximately doubling MTTFPA.

Figure 6:
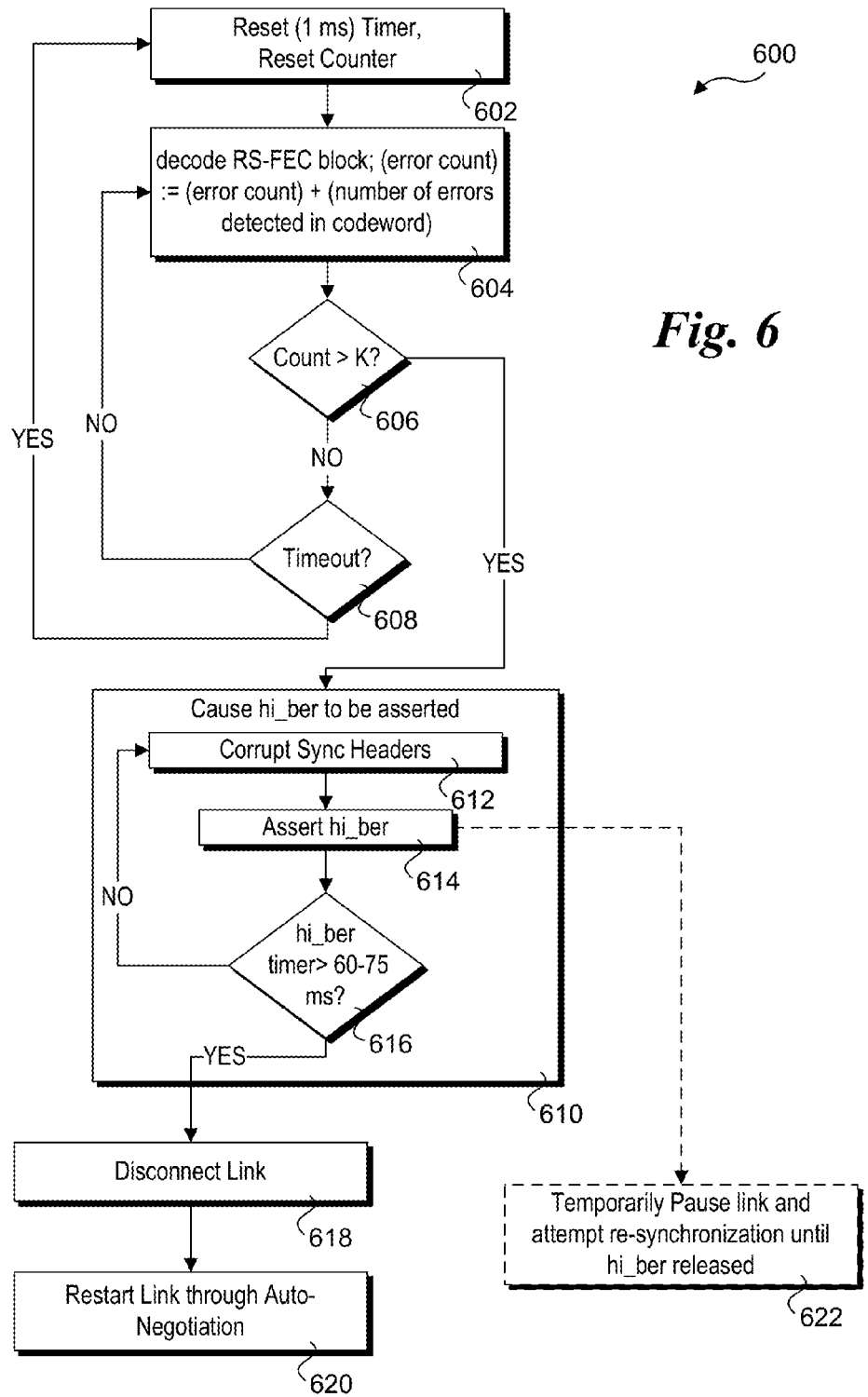
FIG. 6 is a flowchart illustrating operations and logic for implementing a scheme for preventing false packet acceptance based on a symbol error rate, according to one embodiment.

With reference to flowchart 600 of FIG. 6, operations and logic for obtaining a target MTTFPA under mode C based on an SER threshold proceeds as follows. The technique employs an outer and inner loop as depicted by blocks 602, 604, and decision blocks 606 and 608. In block 602, a timer is started, and an error counter is reset. In one embodiment, the timer has a timeout value of 1 ms. For each sampling period having a length equal to the timeout value, symbol errors are detected in block 604, and a count value is incremented. The RS-FEC block is decoded, and the number of errors in the detected codeword (if any) is added to the running error count. As shown by decision block 606, if the error count exceeds a predetermined threshold $K_{max}$, the logic exits the inner loop and proceeds to a block 610. If the count has not reached threshold $K_{max}$ during the sampling period length, the timeout value is detected in decision block 608 and the outer loop returns to block 602 in which the counter and timeout timer are reset.

A symbol error rate exceeding threshold $K_{max}$ provides an indication that the link is operating under a condition that doesn't meet the target MTTFPA value (from which $K_{max}$ is determined, as described below). Therefore, it is desired to cause the link to be disconnected upon detection of such an operating condition, or, optionally, cause the link to be temporarily paused. In one embodiment, a link is disconnected in response to detection of a hi_ber condition; this is accomplished by intentionally continuously corrupting the sync headers in the transmission blocks, as shown in a block 612 of block 610. In one embodiment a 64B/66B block encoding scheme is employed using sync header values of '01' for data blocks or '10' for control blocks, as defined in IEEE Std 802.3-2012 Clause 49.2 (Physical Coding Sublayer (PCS)). In one embodiment, the sync headers are corrupted by setting their value to '11'. Optionally, a value of '00' may be used. To handle hi_ber conditions per the IEEE P802.3bj Draft 2.0, the PHY's BER monitor already includes applicable logic to detect hi_ber through detection of sync header errors. Accordingly, a hi_ber condition that results from intentional corruption of the sync headers is detected and asserted in a block 614. Under the illustrated embodiment, a timer is used to determine whether hi_ber has been asserted for a period of 60 to 75 milliseconds (ms), as depicted by a decision block 616. In response, this cause the link to be disconnected, as shown in a block 618. If Auto-Negotiation is supported and enabled, assertion of hi_ber will cause Auto-Negotiation to restart, as shown in a block 620.

In some embodiments, the high-speed link may be an optical link or otherwise a link that does not disconnect in response to a hi_ber condition. For example, some optical links are configured to temporarily pause the link and attempt re-synchronization until hi_ber is released. Under one embodiment, assertion of hi_ber causes a LOCAL_FAULT, resulting in the receiver being paused. This behavior is depicted in a block 622 of flowchart 600, with the dashed lines indicating this operation and logic is optional.

Figure 7:
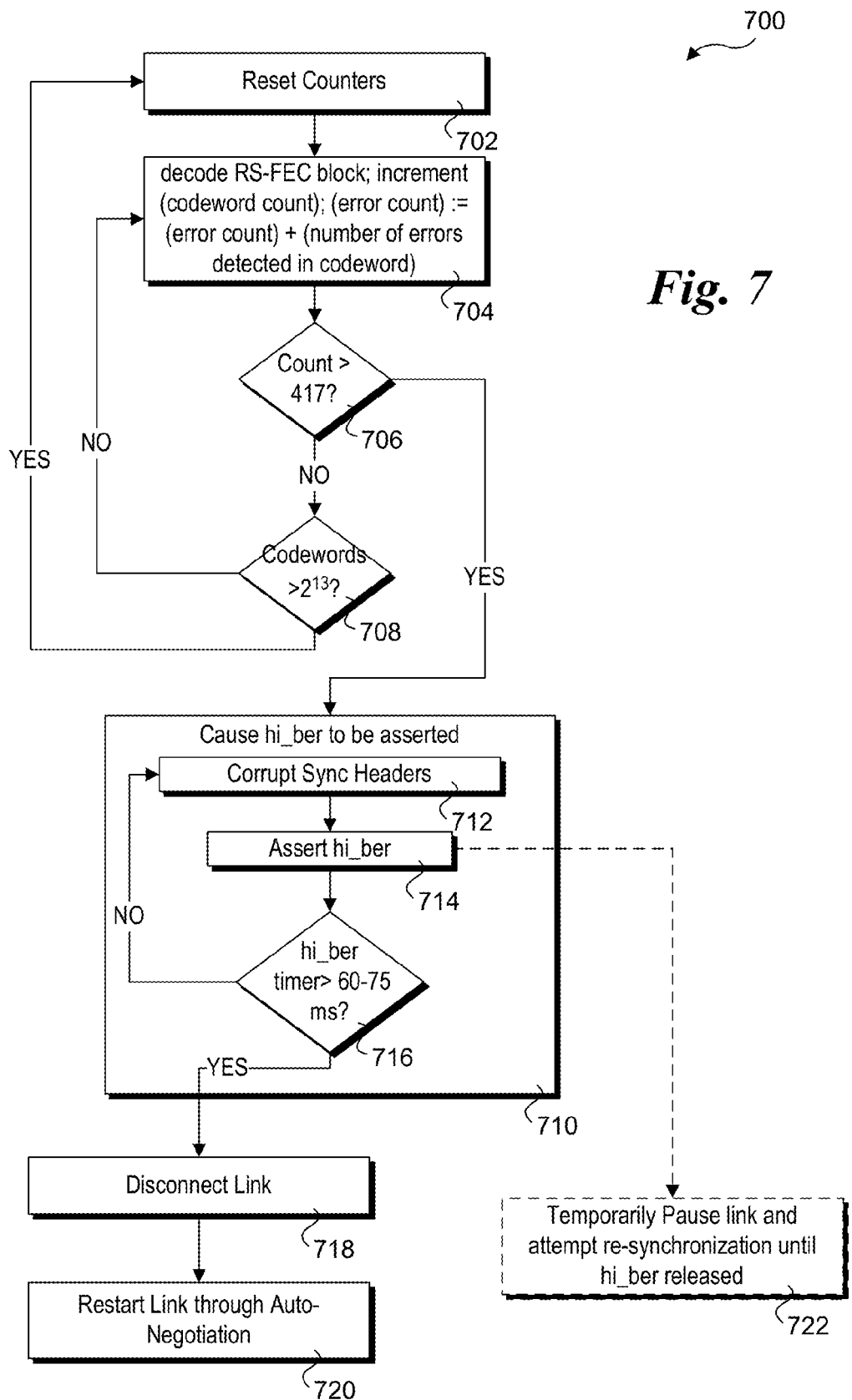
FIG. 7 is a flowchart illustrating operations and logic for implementing a scheme for preventing false packet acceptance based on an symbol error ratio (SER) for a 100GBASE-KR4 or 100GBASE-CR4 link, according to one embodiment.

Under an alternative approach, rather than use a timeout value, a count of a predetermined number of codewords is used between each error counter reset to implement a symbol error ratio threshold. A flowchart illustrating operation and logic for use with a 100GBASE-KR4 or 100GBASE-CR4 RS-FEC, according to one embodiment, is shown in FIG. 7. In one embodiment, the Reed-Solomon decoder counts the number of symbol errors detected on all four FEC lanes in consecutive non-overlapping blocks of 8192 codewords. The operations and logic for implementing this is shown at the top of flowchart 700, which employs an inner and outer loop, including a block 702 in which a symbol error counter and codeword counter are reset and a block 704 in which symbol errors are detected by the RS-FEC and the codeword counter and symbol error counter are updated as applicable. In one embodiment, the SER threshold is 417 symbol errors in $2^{13}$ (8192) codewords. Accordingly, a determination is made in a decision block 706 to whether the symbol error count has exceeded 417, while the symbol error counter is reset every $2^{13}$ codewords, with the corresponding logic depicted by decision block 708. In one embodiment, a frame having a length of $2^{13}$ codewords is used, wherein the symbol error counter is reset every time the start of a frame is detected (thus making the blocks non-overlapping).

Upon detection of the SER count exceeding 417 symbol errors, the logic proceeds to block 710 in which a hi_ber condition is caused to be asserted. As before, this may be accomplished by continuously corrupting sync headers, as shown in a block 712, which will cause hi_ber to be asserted in a block 714. As before, a timer is used to determine whether hi_ber has been asserted for a period of 60 to 75 milliseconds (ms), as depicted by a decision block 716. This will result in the BER monitor detecting a hi_ber condition, causing the link to be disconnected, as shown in a block 718. The link is then restarted in a block 720 using Auto-Negotiation. As an option to disconnecting, the link may be temporarily paused and re-synchronization is attempted until hi_ber is released, as shown in a block 722.

In addition to preventing false packet acceptance on 100GBASE-KR4 and 100GBASE-CR4 links, a similar approach with different parameters may be employed for 100GBASE-KP4 links. As discussed above, 100GBASE-KP4 links employ PAM4 encoding and the RS-FEC layer is configured to correct up to 15 symbol errors within a codeword of 544 symbols (514 data symbols plus 30 parity symbols).

Figure 7A:
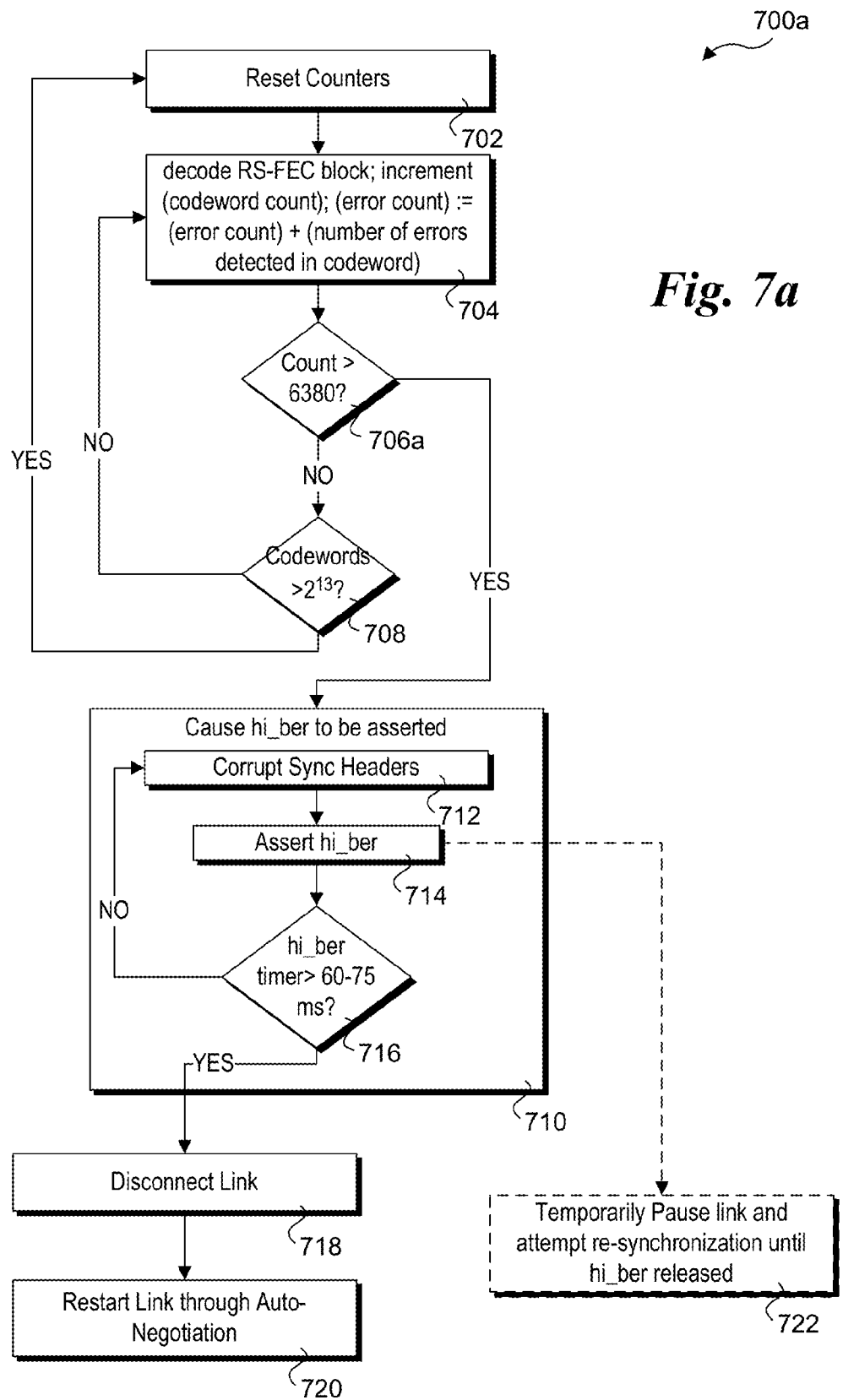
FIG. 7a is a flowchart illustrating operations and logic for implementing a scheme for preventing false packet acceptance based on an SER for a 100GBASE-KP4, according to one embodiment.

FIG. 7a shows a flowchart 700a depicting operations and logic for implementing a technique for preventing false packet acceptance using mode C for a 100GBASE-KP4 link, according to one embodiment. As illustrated, all of the blocks in flowchart 700 and 700a sharing the same reference numbers perform similar operations, wherein the difference lies in the SER threshold count value in decision block 706a, which now has a value of 6380.

As discussed above, to get MTTFPA to be approximately equal to AOU, SER needs to be less than 6.6e-5. For 100GBASE-KR4 and 100GBASE-CR4 links, each code word has 528 symbols (514 data symbols plus 14 parity symbols), and the number of symbol errors in $2^{13}$ codewords (a period T≈419 microseconds) has a Binomial distribution~B(n,SER) with n=528*$2^{13}$; the probability of having exactly k errors in this period is:

$$P(x=k) = \binom{n}{k} SER^K (1-SER)^{n-k} \qquad (2)$$

The cumulative distribution (probability of having up to K errors) can be calculated using analytical methods (e.g., one implementation employs the BINOMDIST function in Microsoft Excel®). It is very sensitive to SER as discussed below and shown in FIGS. 8 and 11. The mean time to disconnect (MTTD) is obtained from:

$$MTTD(K) = \frac{T}{1 - P(x \leq K)} \quad (3)$$

According to aspects of some embodiments, values for SER thresholds are determined using statistical analysis using the foregoing equations and functions, as well as other functions. Under one approach, values for MTTFPA and MTTD are modeled using formulas and parameters entered in Microsoft Excel®) spreadsheets. Of course, other software tools for performing this type of analysis may be used, such as Mathematica, MatLab, etc.

Figure 8:
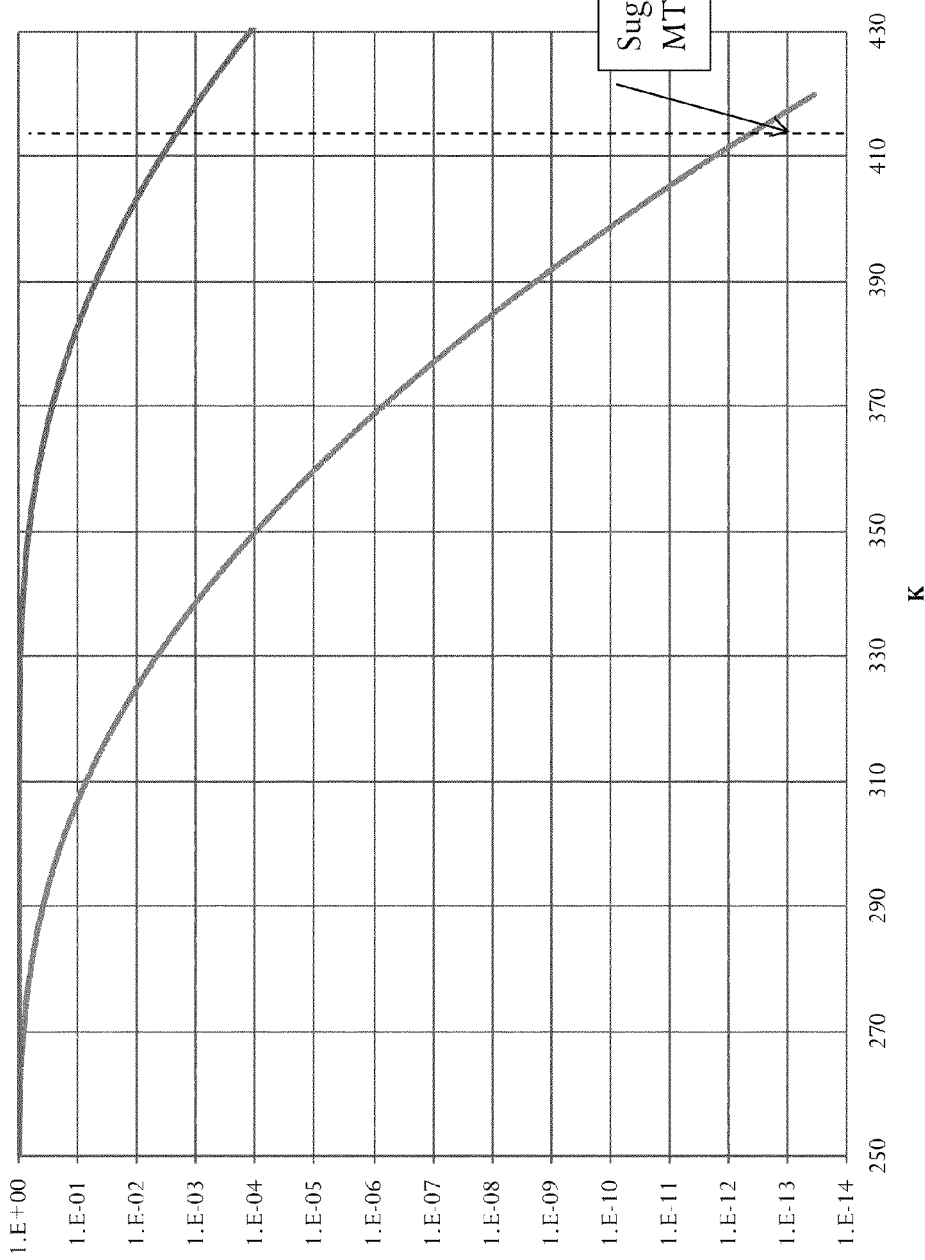
FIG. 8 is a graph illustrating the cumulative binomial distribution sensitivity to SER for a 100GBASE-KR4 or 100GBASE-CR4 link using two probabilities under which SER=6.6e-5 and 8.3e-5.

FIG. 8 is a graph illustrating the cumulative binomial distribution sensitivity to SER for a 100GBASE-KR4 or 100GBASE-CR4 link using two scenarios, SER=6.6e-5 (creating MTTFPA=15 billion years) and SER=8.3e-5 (MTTFPA=2.5 billion years). As shown, the two curves have significantly different results for K=417. This illustrates the easy discrimination between sufficient and insufficient link quality provided by this method.

Another input factor for link performance is signal-to-noise ratio. As discussed above, using one set of link parameters, increasing the SNR by only 0.90 yields an MTTFPA of 15 billion years, as compared with an MTTFPA of only 4900 years with no SNR improvement. Results for selected link parameters and MTTFPA using Modes A, B, C and D with different SNR improvement levels are depicted in FIG. 9. As discussed above, an approximately 10× increase an MTTFPA can be obtained with each 0.15 dB increase in SNR.

Figure 10:
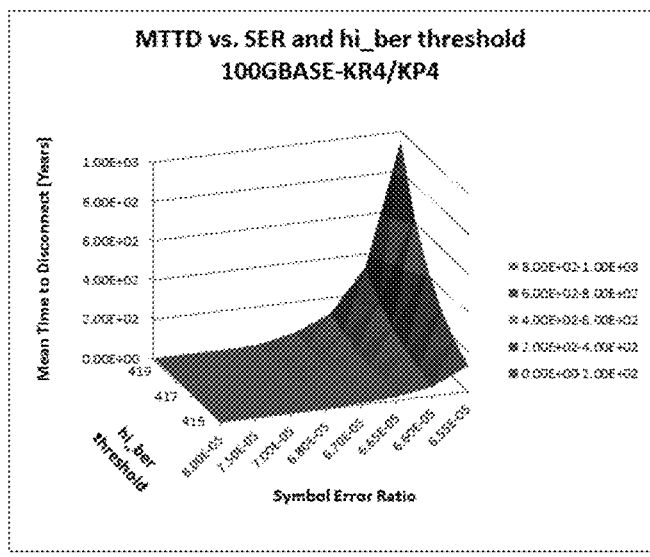
FIG. 10 is a comparison diagram illustrating the effect of changes to the hi_ber threshold on MTTD.

It is advantageous In one embodiment, the link parameters are configured such that when SER<6.6e-5 (which results in MTTFPA of at least 15 billion years), the link should almost never be disconnected, but a slight increase of SER will cause it to quickly disconnect. As shown by way of the graphs in FIG. 10, using a hi-ber threshold of 417 for blocks having a length of 8192 codewords (where the expected number of errors under the SER assumption is at most 285) results in an MTTD of >100 years for SER<6.6e-5, which is high enough; the MTTD is very sensitive to the threshold choice, and a careful analysis is required to match the desired MTTD with the sufficient MTTFPA. FIG. 10 also illustrates the high sensitivity of MTTD to SER. For example, if K=417 and SER is increased from 6.6e-5 to 8.00e-5, the MTTD drops to approximately 4 seconds. SER=8.00e-5 also corresponds to a MTTFPA of approximately 3.2 billion years. In one embodiment, a link SER condition (SER~9.28e-5) that would result in an MTTFPA of approximately 1 billion years will result in disconnection of the link in less than a second when K=417.

Figure 11:
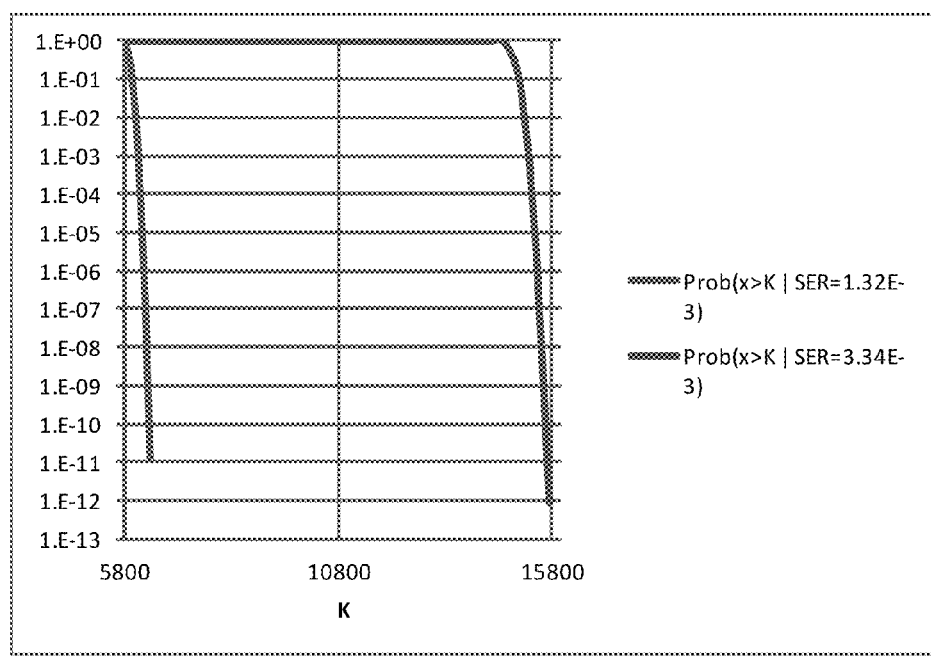
FIG. 11 is a graph illustrating the cumulative binomial distribution sensitivity to SER for a 100GBASE-KP4 link using two probabilities under which SER=1.32e-3 and 3.34e-3.

FIG. 11 is a graph illustrating the cumulative binomial distribution sensitivity to SER for a 100GBASE-KP4 link using two probabilities under which SER=1.32e-3 and 3.34e-3. Since the PAM4 encoding scheme used by 100GBASE-KP4 employs more complex symbols than the symbols used under the PAM2 encoding used for 100GBASE-KR4 and 100GBASE-CR4 links, there is a greater likelihood of symbol errors, and the RS-FEC chosen for this case can correct more errors per code word. Accordingly, the symbol error rate and SER thresholds are significantly higher for the 100GBASE-KP4 PHY. As discussed above, in one embodiment an SER threshold of 6380 is employed for 100GBASE-KP4 links.

Exemplary Implementation Environment and Blade Server Architecture

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 12a-c, and 13. Under a typical configuration, a rack-mounted chassis 1200 is employed to provide power and communication functions for a plurality of server blades (i.e., blades) 1202, each of which occupies a corresponding slot. (It is noted that all slots in a chassis do not need to be occupied.) In turn, one or more chassis 1200 may be installed in a blade server rack 1203 shown in FIG. 12c. Each blade is coupled to an interface plane 1204 (i.e., a backplane or mid-plane) upon installation via one or more mating connectors. Typically, the interface plane will include a plurality of respective mating connectors that provide power and communication signals to the blades, and including routed signal paths for coupling Ethernet signals between blades. Under current practices, many interface planes provide "hot-swapping" functionality—that is, blades can be added or removed ("hot-swapped") on the fly, without taking the entire chassis down through appropriate power and data signal buffering.

Figure 12A:
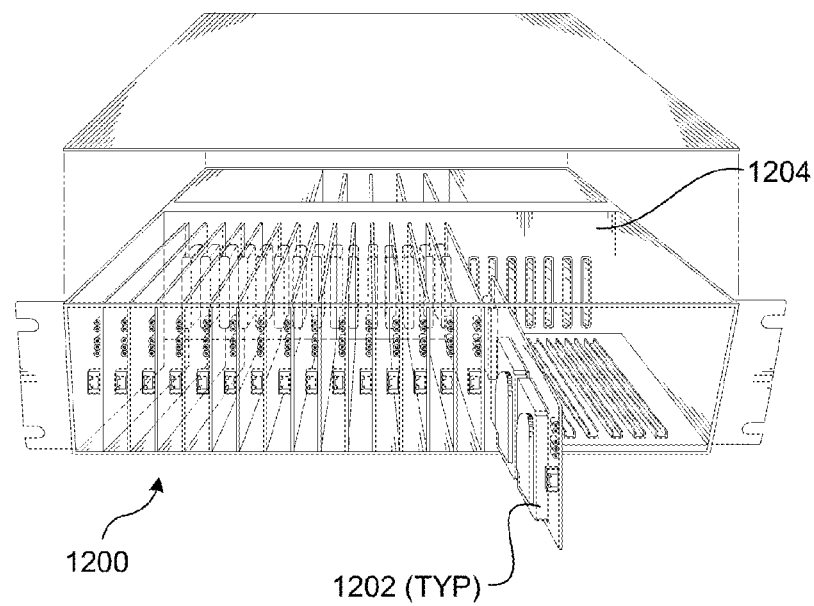
FIG. 12a is a frontal isometric view of an exemplary blade server chassis in which a plurality of server blades are installed.
Figure 12B:
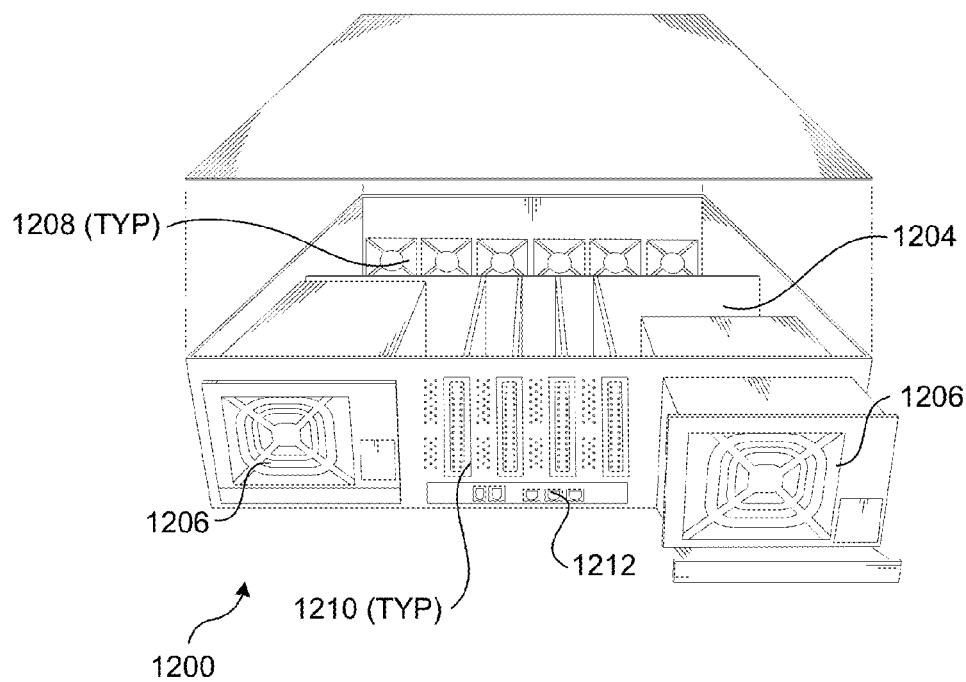
Figure 12C:
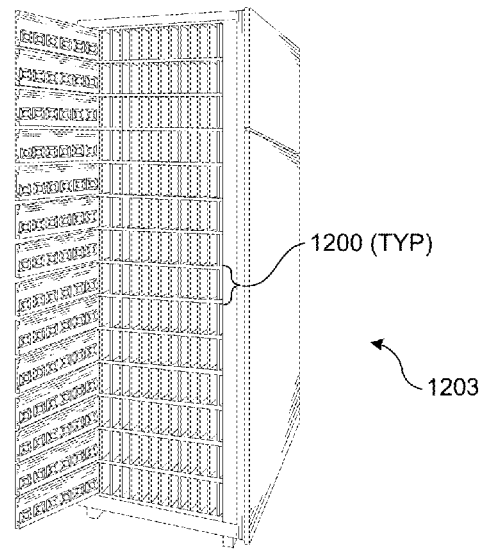
FIG. 12c is an isometric frontal view of an exemplary blade server rack in which a plurality of rack-mounted blade server chassis corresponding to FIGS. 12a and 12b are installed.

A typical mid-plane interface plane configuration is shown in FIGS. 12a and 12b. The backside of interface plane 1204 is coupled to one or more power supplies 1206. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1208 are employed to draw air through the chassis to cool the server blades.

An important feature required of all blade servers is the ability to communicate externally with other IT infrastructure. This is typically facilitated via one or more network connect cards 1210, each of which is coupled to interface plane 1204. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1212 that is coupled to the backside or frontside of the interface plane. As yet another option, a management or configuration server may be employed to manage blade activities, wherein communications are handled via standard computer networking infrastructure, for example, Ethernet.

Figure 13:
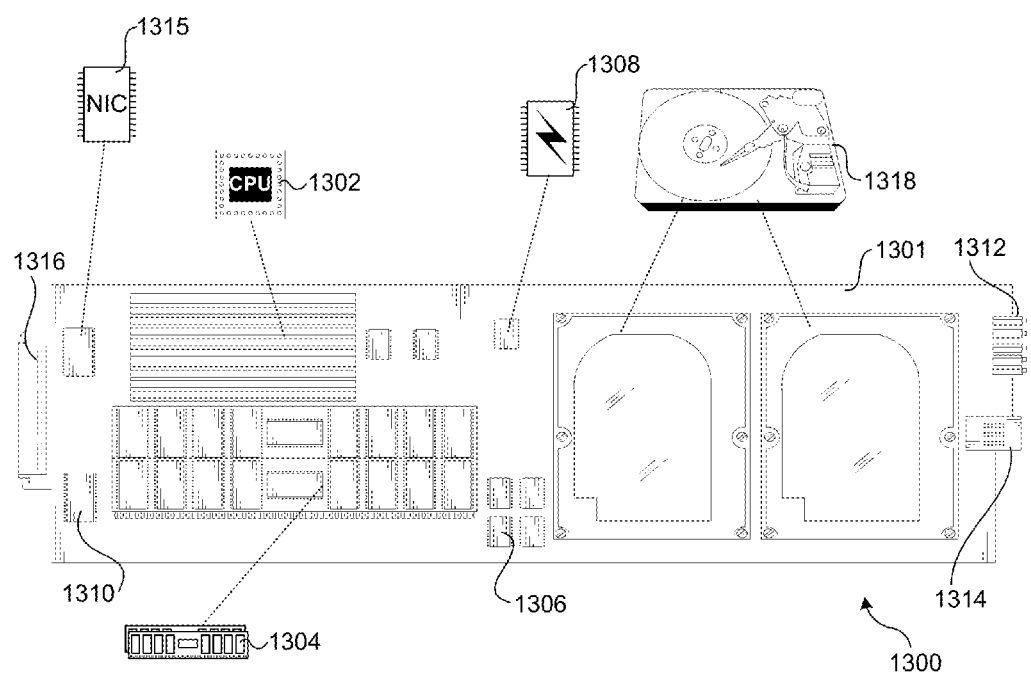
FIG. 13 shows details of the components of a typical server blade, according to one embodiment.

With reference to FIG. 13, further details of an exemplary blade 1300 are shown. As discussed above, each blade comprises a separate computing platform that is configured to perform server-type functions, i.e., is a "server on a card." Accordingly, each blade includes components common to conventional servers, including a main printed circuit board (main board) 1301 providing internal wiring (i.e., buses) for coupling appropriate integrated circuits (ICs) and other components mounted to the board. These components include one or more processors 1302 coupled to system memory 1304 (e.g., some form of Random Access Memory (RAM)), cache memory 1306 (e.g., SDRAM), and a firmware storage device 1308 (e.g., flash memory). A NIC (network interface controller) chip 1310 is provided for supporting conventional network communication functions, such as to support communication between a blade and external network infrastructure. Other illustrated components include status LED (light-emitting diodes) 1312, a set of RJ-45 console ports 1314 (only one of which is shown for simplicity), and a NIC 1315 coupled to an interface plane connector 1316. Additional components include various passive components (i.e., resistors, capacitors), power conditioning components, and peripheral device connectors.

Generally, each blade 1300 may also provide on-board storage. This is typically facilitated via one or more built-in disk controllers and corresponding connectors to which one or more disk drives 1318 are coupled. For example, typical disk controllers include SATA controllers, SCSI controllers, and the like. A solid state drive (SSD) may be used in place of disk drive 1318. As an option, the disk drives may be housed separate from the blades in the same or a separate rack, such as might be the case when a network-attached storage (NAS) appliance or backend storage sub-system that is employed for storing large volumes of data.

NIC 1310 comprises circuitry and logic for facilitating corresponding networking operations, such as support for physical layer (L1) and data link layer operations (L2). Typically, upper layer operations are facilitated by an operating system network stack that would be hosted by an operating system running on processor 1302. However, in some embodiments, a NIC may employ its own network stack via embedded logic or the like.

In a typical data center deployment, network switching elements comprise rack-mounted equipment, such as would occupy a 1U, 2U, or 4U slot, or may be implemented via one or more server blades. Optionally, a network switching element may be implemented use one or more server blades.

NIC 1315 comprises circuitry and logic for implementing high-speed communication between multiple blades 1300 via interface plane 1204. In one embodiment, NIC 1415 is configured to implement signaling and logic corresponding to the 100 Gb/s embodiments disclosed herein, including circuitry and logic for implementing a 100GBASE-KR4/CR4/CP4 port and associated RS-FEC layer operations. To further facilitate inter-blade communication over the 100GBASE-KR4, interface plane 1204 includes appropriate connectors, circuitry and wiring for facilitating the physical media aspect of the PHY (wiring not shown). For example, the circuitry may comprise connectors and wiring for facilitating signaling over 8 differential pairs in accordance with the configuration shown in FIG. 1.

In general, aspects of the link training embodiments disclosed herein may be implemented hardware (via, e.g., embedded logic), or via a combination of hardware and software. For example, a network element may include a processor running a software-based network stack and associated logic implemented via software for performing aspects of the operations described herein. Optionally, similar logic could be implemented via embedded logic in a NIC, large-scale network interface, or the like.

In addition to implementation in a blade server, the principles and teachings herein may be implemented via other types of equipment, such as telecommunications routers and switches. For example, a typical telecom switch comprises a rack with multiple cards coupled to a backplane, wherein the cards are generally analogous to the blades and the backplane is analogous to the interface plane in a blade server. Accordingly, the cards would be configured with circuitry and logic for implemented 100GBASE-KR4/CR4/KP4 ports, and the backplane would include connectors, circuitry, and wiring for facilitating the physical media aspect of the 100GBASE-KR4 and 100GBASE-KP4 PHYs.

Figure 14:
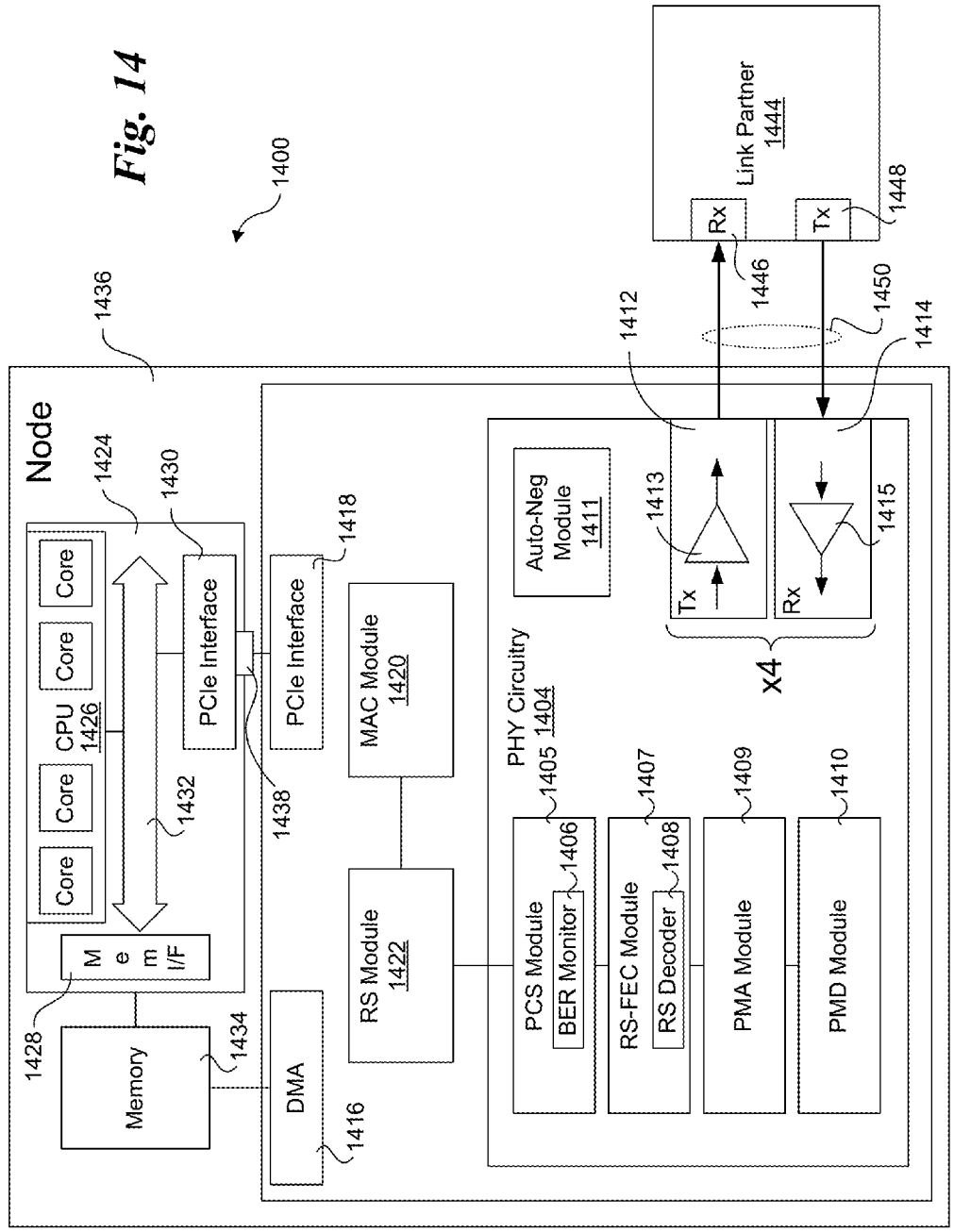
FIG. 14 is a schematic diagram illustrating an architecture for a network node employing a network chip configured to implement prevention of false packet acceptance in accordance with the embodiments disclosed herein.

FIG. 14 shows an architecture 1400 for a network node employing a network chip 1402 configured to prevent false packet acceptance in accordance with aspects of the embodiments disclosed herein. Network chip 1402 comprises PHY circuitry 1404 including a Physical Coding Sublayer (PCS) module 1405 including a BER monitor 1406, an RS-FEC module 1407 including an RS decoder 1408, a PMA module 1409, a PMD module 1410, an auto-negotiation module 1411, a transmitter port 1412 including transmitter circuitry 1413 and a receiver port 1414 including receiver circuitry 1415. Network chip 1402 further includes a DMA (Direct Memory Access) interface 1416, a Peripheral Component Interconnect Express (PCIe) interface 1418, a MAC module 1420 and a Reconciliation Sublayer (RS) module 1422. Network node 1400 also comprises a System on a Chip (SoC) 1424 including a Central Processing Unit (CPU) 1426 having one or more processor cores, coupled to a memory interface 1428 and a PCIe interface 1430 via an interconnect 1432. Memory interface 1428 is further depicted as being coupled to memory 1434. Under a typical configuration, network chip 1402, SoC 1424 and memory 1434 will be mounted on or otherwise operatively coupled to a circuit board 1436 that includes wiring traces for coupling these components in communication, as depicted by single lines connecting DMA 1416 to memory 1434 and PCIe interface 1418 to PCIe interface 1430 at a PCIe port 1438.

In one embodiment, MAC module 1420 is configured to implement aspects of the MAC layer operations performed by embodiments described herein. Similar, RS module 1422 is configured to implement reconciliation sub-layer operations.

During link initialization, auto-negotiation module 1411 is implemented for auto-negotiation of link speed and capabilities. The auto-negotiation format consists of a base-page, which is the first set of formatted information exchanged with the link partner, as depicted by a link partner 1444 including a receiver port 1446 and a transmitter port 1448. In one embodiment the configuration of node 1400 and link partner 1444 are similar, and are linked in communication via an Ethernet link 1450.

In one embodiment, network chip 1402 comprises a 100 Gb/s Ethernet Network Interface Controller (NIC) chip employing a 100GBASE-KR4, 100GBASE-CR4, or 100GBASE-KP4 PHY. However, the circuitry and components of network chip 1402 may also be implemented in other types of chips and components, including SoCs, multi-chip modules, and NIC chips including support for multiple network interfaces (e.g., wired and wireless).

In addition, embodiments of the present description may be implemented not only within a semiconductor chip such as a NIC, but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

In addition to high-speed Ethernet links, aspects of the embodiments disclosed herein may be implemented in other types of high-speed links, such as but not limited to optical links and InfiniBand® links. Similarly, the teachings and principles disclosed herein may be applied to both existing and future high-speed links.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
    detecting a correctable symbol error ratio (SER) for a high-speed link which employs forward error correction (FEC); and
    disconnecting or temporarily pausing the high-speed link if the correctable SER exceeds a predetermined threshold,
    wherein the high-speed link couples a pair of link partners in communication and includes four Forward Error Correction (FEC) lanes, and each link partner includes a Physical (PHY) interface including a Reed-Solomon Forward Error Correction (RS-FEC) sublayer, and wherein detecting the correctable SER comprises employing a Reed-Solomon decoder in the RS-FEC sublayer to count a number of correctable symbol errors detected on the four FEC lanes of in consecutive non-overlapping blocks of 8192 codewords.

2. The method of claim 1, further comprising:
    operating the high-speed link under a mode in which correctable symbol errors are corrected while uncorrectable symbol errors are passed through without marking.

3. The method of claim 1, wherein the predetermined threshold is set such that the correctable SER is one of approximately 6.6e-5 or approximately 1.3e-3.

4. The method of claim 1, wherein the high-speed link comprises one of an IEEE 100GBASE-KR4 or 100GBASE-CR4 Ethernet link, and the predetermined threshold is 417 correctable symbol errors per 8192 codewords.

5. The method of claim 1, wherein the high-speed link comprises an IEEE 100GBASE-KP4 Ethernet link, and the predetermined threshold is 6380 correctable symbol errors per 8192 codewords.

6. The method of claim 1, wherein the predetermined threshold is determined using a statistical model such that a mean time to false packet acceptance (MTTFPA) exceeds a predetermined value.

7. The method of claim 6, wherein the MTTFPA is approximately at least 15 billion years.

8. The method of claim 7, wherein the high-speed link is configured to operate such that it has a projected mean time to disconnect (MTTD) of at least 100 years.

9. The method of claim 1, wherein disconnecting the high-speed link comprises:
   continuously corrupting block sync headers to generate a hi_ber condition for a predetermined period; and
   disconnecting the link after the predetermined period.

10. An apparatus comprising:
   Physical Layer (PHY) circuitry, including,
      a transmitter port including transmitter circuitry for four transmit lanes; and
      a receiver port including receiver circuitry for four receive lanes;
   a Physical Coding Sublayer (PCS) module;
   a Reed-Solomon Forward Error Correction (RS-FEC) module coupled to the PCS module and configured to,
      detect correctable symbol errors;
      correct the correctable symbol errors; and
      determine if a correctable symbol error ratio (SER) exceeds an SER threshold,
   wherein the PHY is configured to be implemented in an Ethernet link including four Forward Error Correction (FEC) lanes, and wherein determining if a correctable symbol error rate (SER) exceeds an SER threshold comprises employing a Reed-Solomon decoder in the RS-FEC module to count a number of correctable symbol errors detected on all four FEC lanes of the Ethernet link in consecutive non-overlapping blocks of 8192 codewords.

11. The apparatus of claim 10, wherein the SER threshold is one of approximately 6.6e-5 or approximately 1.3e-3.

12. The apparatus of claim 10, wherein the Ethernet link comprises one of an IEEE 100GBASE-KR4 or 100GBASE-CR4 link, and the SER threshold is 417 correctable symbol errors per 8192 codewords.

13. The apparatus of claim 10, wherein the Ethernet link comprises an IEEE 100GBASE-KP4 link, and the predetermined threshold is 6380 correctable symbol errors per 8192 codewords.

14. The apparatus of claim 10, wherein the PHY circuitry is configured to be implemented in an Ethernet link employing Media Access Channel (MAC) frames using a 32-bit Cyclic Redundancy Check (CRC32), and wherein the SER threshold is determined using a statistical model such that a mean time to false packet acceptance (MTTFPA) for MAC frames exceeds approximately 15 billion years.

15. The apparatus of claim 14, wherein the Ethernet link is configured to operate such that it has a projected mean time to disconnect (MTTD) of at least 100 years.

16. The apparatus of claim 10, wherein the PCS module includes a bit error ratio (BER) monitor, and wherein in response to detection of a correctable SER exceeding the SER threshold the RS-FEC module is configured to forward blocks with corrupted sync headers to the PCS module, and the BER monitor is configured to detect the corrupted sync headers and generate a hi_ber condition.

17. An apparatus comprising:
   Physical Layer (PHY) circuitry, including,
      a transmitter port including transmitter circuitry for four transmit lanes; and
      a receiver port including receiver circuitry for four receive lanes;
   a Physical Coding Sublayer (PCS) module;
   a Reed-Solomon Forward Error Correction (RS-FEC) module coupled to the PCS module;
   a Media Access Control (MAC) module;
   a Reconciliation Sublayer (RS) module; and
   a Peripheral Component Interconnect Express (PCIe) interface;
   wherein the RS-FEC module is configured to,
      detect correctable symbol errors;
      correct the correctable symbol errors; and
      determine if a correctable symbol error ratio (SER) exceeds an SER threshold,
   wherein the PHY is configured to by implemented in an Ethernet link including four Forward Error Correction (FEC) lanes, and wherein determining if a correctable SER exceeds an SER threshold comprises employing a Reed-Solomon decoder in the RS-FEC module to count a number of correctable symbol errors detected on all four FEC lanes of the Ethernet link in consecutive non-overlapping blocks of 8192 codewords.

18. The apparatus of claim 16, wherein the SER threshold is one of approximately 6.6e-5 or approximately 1.3e-3.

19. The apparatus of claim 16, wherein the Ethernet link comprises one of an IEEE 100GBASE-KR4 or 100GBASE-CR4 link, and the SER threshold is 417 correctable symbol errors per 8192 codewords.

20. The apparatus of claim 16, wherein the Ethernet link comprises an IEEE 100GBASE-KP4 link, and the SER threshold is 6380 correctable symbol errors per 8192 codewords.

21. The apparatus of claim 16, wherein the PHY circuitry is configured to be implemented in an Ethernet link employing Media Access Control (MAC) frames using a 32-bit Cyclic Redundancy Check (CRC32), and wherein the SER threshold is determined using a statistical model such that a mean time to false packet acceptance (MTTFPA) for MAC frames exceeds approximately 15 billion years.

22. The apparatus of claim 21, wherein the wherein the Ethernet link is configured to operate such that it has a projected mean time to disconnect (MTTD) of at least 100 years.

23. A system comprising:
   a chassis;
   an inter-plane, mounted within the chassis, having first and second inter-plane connectors and wiring coupled therebetween configured to facilitate a multi-lane 100 Gigabits per second (Gb/s) Ethernet link;
   a first board having a first network interface controller (NIC) including 100 Gb/s Ethernet transmitter and receiver ports operatively coupled to a first board connector that is coupled to the first inter-plane connector;
   a second board having a second NIC including 100 Gb/s Ethernet transmitter and receiver ports operatively coupled to a second board connector that is coupled to the second inter-plane connector,
   wherein the 100 Gb/s Ethernet transmitter for each of the first and second NICs is configured to transmit data over four transmit lanes, and the first NIC is configured, when the system is operating, to
      receive data from the second NIC via the 100 Gb/s Ethernet link;

determine if a correctable symbol error ratio (SER) exceeds an SER threshold; and, in response thereto, disconnect the 100 Gb/s Ethernet link, wherein the first NIC includes a Reed-Solomon Forward Error Correction (RS-FEC) module and the 100 Gb/s Ethernet includes four Forward Error Correction (FEC) lanes, and wherein determining if a correctable SER exceeds then SER threshold comprises employing a Reed-Solomon decoder in the RS-FEC module to count a number of correctable symbol errors detected on all four FEC lanes of the Ethernet link in consecutive non-overlapping blocks of 8192 codewords.

24. The system of claim 23, wherein the SER threshold is one of approximately 6.6e-5 or approximately 1.3e-3.

25. The system of claim 23, wherein the 100 Gb/s Ethernet is configured to transmit Media Access Control (MAC) frames using a 32-bit Cyclic Redundancy Check (CRC32), and wherein the SER threshold is determined using a statistical model such that a mean time to false packet acceptance (MTTFPA) for MAC frames exceeds 15 billion years.

26. The system of claim 25, wherein the 100 Gb/s Ethernet is configured to operate such that it has a projected mean time to disconnect (MTTD) of at least 100 years.

\* \* \* \* \*